United States Patent [19]

Haley

[11] 4,090,008
[45] May 16, 1978

[54] EDGE ABRASION RESISTANT PLASTIC STRAPPING AND METHOD AND APPARATUS FOR MAKING THE SAME

[75] Inventor: Harold A. Haley, Media, Pa.

[73] Assignee: FMC Corporation, Philadelphia, Pa.

[21] Appl. No.: 685,554

[22] Filed: May 12, 1976

[51] Int. Cl.² ............................................. B32B 3/02
[52] U.S. Cl. .................................. 428/192; 428/212; 428/910
[58] Field of Search ...................... 428/192, 910, 212; 264/50, 53, 146, 147, 157, 288, 291, DIG. 8; 57/157; 28/72 R

[56] References Cited

U.S. PATENT DOCUMENTS 3,394,045  7/1968  Gould .................................. 428/409
3,532,482  10/1970  Weisbart ............................. 428/192

Primary Examiner—Marion E. McCamish
Attorney, Agent, or Firm—Eugene G. Horsky

[57] ABSTRACT

A generally rectangular plastic strapping having an improved resistance to edge abrasion, and a method and apparatus for making the same, such strapping being formed of orientable, thermoplastic, polymeric material, worked to orient the molecules thereof in predominantly the longitudinal direction, subjected to heat applied essentially to the surface of the longitudinal edges thereof, to fuse at least fibrils projecting therefrom and to provide such strapping edge surfaces with at least portions which are essentially free of molecular orientation, and then cooled to room temperature.

10 Claims, 4 Drawing Figures

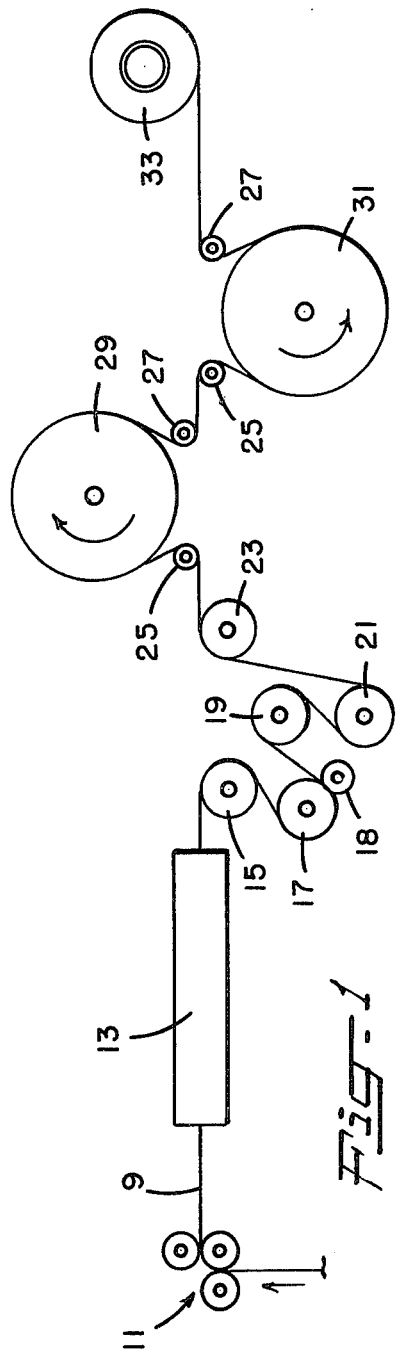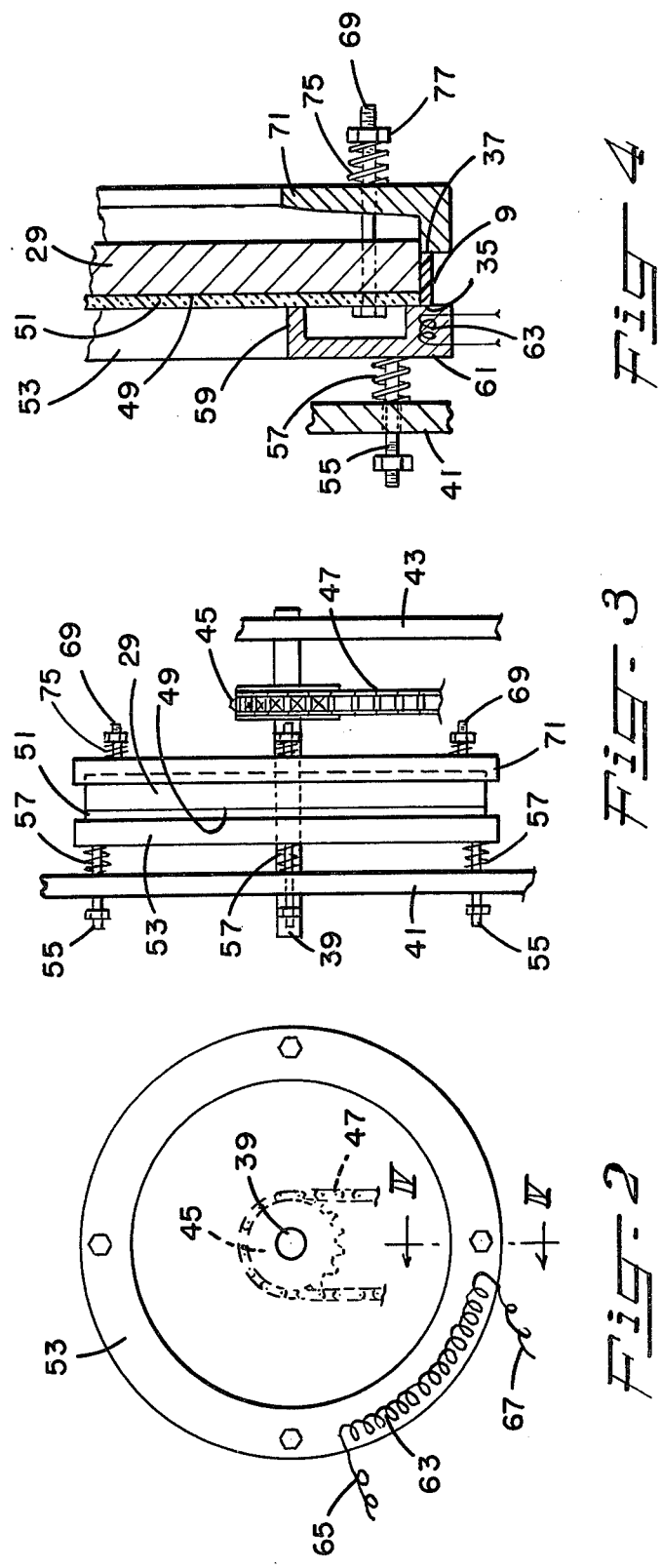

EDGE ABRASION RESISTANT PLASTIC STRAPPING AND METHOD AND APPARATUS FOR MAKING THE SAME

The present invention is directed to an improved plastic strapping which possesses predominantly a longitudinal molecular orientation and which exhibits an improved resistance to edge abrasion, and to a method and apparatus for making such improved strapping.

In the conventional manufacture of plastic strapping for use in binding of packages and the like, an orientable, thermoplastic, polymeric material, such as, a resin including polyproplene, nylon or polyester as a major portion thereof, is melt-extruded and quenched to provide a continuous structure of desired cross section. This shaped plastic structure is then stretched longitudinally or compression-rolled to orient the molecules thereof and thus impart improved tensile strength, creep resistance and other desirable characteristics to such structure.

Longitudinally stretched as well as compression-rolled plastic structures exhibit longitudinal molecular orientation, with the longitudinal orientation of the molecules of the stretch-oriented structure being prodominant and more pronounced. Thus, both of such molecularly oriented plastic structures have a propensity to fibrillate or split longitudinally when subjected to forces applied transversely thereof, with this tendency being more manifest in the more highly oriented, and therefore stronger, longitudinally stretched plastic structure.

Longitudinal splitting of oriented plastic structures may well make lacing of such structures through machines, tools, and seals and the like very troublesome, but is generally of little concern once such plastic structures are applied to a package. Proposals for minimizing this splitting include, for example, the incorporation of inorganic particles within the plastic material from which such structures are formed, embossing of the plastic structures following the orientation thereof and the fusing of at least one of opposing side surfaces of the oriented plastic structures to a depth of at least 1 mil.

This latter procedure is described in some detail in U.S. Pat. No. 3,394,045 issued to Gould wherein an extruded sheet of polypropylene is reduced in thickness by compression between heated rollers which cause plastic flow in the longitudinal direction; cooled to a temperature of between 100° F and 250° F while under compressive forces and then stretched in the longitudinal direction to provide the same with a planar orientation; flash heated at a temperature of between 375° F and 525° F to cause fusion in the sheet surfaces to a depth of one to about three mils; and, after cooling of such sheet, slitting the same into strapping of desired widths.

The flash heating technique described in the above noted patent involves a reduction in the effective thickness of the resulting oriented strapping; that is, the strapping thickness in which the molecules are oriented. Thus, this known flash heating technique results in a decrease in the tensile strength of the plastic structure, a factor which may be significant, especially with roll oriented plastic structures which inherently possess lower tensile strengths then corresponding plastic structures oriented by longitudinal stretching.

Of further importance is that the known flash heating procedure fails to remedy or minimize the tendency for molecularly oriented strapping to dust or fibrillate when subjected to abrasion along the longitudinal edges thereof. This tendency is apparent, to varying degrees, with roll oriented strapping, whether formed and oriented as individual units or slit from roll oriented sheets, but is particularly noticeable with stretch-oriented plastic strapping. Obviously, strapping slit from molecularly oriented, flash-heated sheets is likely to experience some fibrillation or dusting along its longitudinal edges, since the molecularly oriented core of such strapping is exposed at its longitudinal edges. Embossing of molecularly oriented strapping does not alleviate this edge dusting problem and may well aggravate the same by disrupting the continuity of the surfaces along the strapping edges.

More specifically, longitudinal stretching of strapping provides for a pronounced or high degree of orientation of the polymer molecules in the direction longitudinally of the strapping which is evidenced by a fibrillated character along the edges of such strapping and by minute fibrils projecting from the surfaces of such strapping edges. When this highly oriented strapping is subjected to edge abrasion, as during transit through a strapping machine or tool, edge fraying of strapping results with the minute fibrils projecting from the strapping edge surfaces, as well as fibers extending along such edge surfaces, being dislodged as a fine dust.

In the absence of frequent, tedious and time consuming cleaning of the machines and tools with which such strapping is employed, deposits of this strapping dust rapidly collect within such machines and tools and much too often interfere severely with their operation. Accordingly, a primary object of this invention is the provision of an improved and generally more satisfactory molecularly oriented plastic strapping and a method and apparatus for making same.

Another object is the provision of a generally rectangular, molecularly oriented plastic strapping which has improved resistance to edge abrasion.

Still another object is a provision of a generally rectangular plastic strapping which is molecularly oriented in predominantly a longitudinal direction, is substantially free of edge projecting fibrils, and exhibits an improved resistance to dusting along the longitudinal edge surfaces thereof.

A further object is the provision of an improved method in which a generally rectangular plastic strapping is molecularly oriented predominantly in a longitudinal direction and is provided with an improved resistance to edge abrasion without any material reduction in its tensile strength or other desirable characteristics thereof.

A still further object is the provision of an apparatus of use in treating opposite longitudinal edge surfaces of a travelling, generally rectangular, molecularly oriented plastic strapping to impart thereto improved and generally uniform and consistent resistance to edge abrasion.

These and other objects of the present invention are accomplished by a generally rectangular, molecularly oriented plastic strapping in which the surfaces of its opposite longitudinal edges are substantially free of protecting fibrils and have at least portions thereof which are fused and are essentially free of molecular orientation. The fused portions of the strapping edge surfaces may be substantially continuous and, in all instances, the fusion is confined to essentially the strapping edge surfaces and is of minimal depth; that is, as shallow as can be achieved, yet provide for the desired results.

In accordance with the method of the present invention, a generally rectangular plastic strapping is first worked to orient the molecules thereof in predominantly a longitudinal direction thereof, then heat is applied essentially to only the surfaces of the opposite longitudinal edges of the worked strapping to fuse at least fibrils projecting therefrom and provide such strapping edge surfaces with at least portions which are essentially free of molecular orientation, after which the fused edge portions of strapping are cooled to the ambient or room temperature.

The application of heat to the strapping edge surfaces is preferably achieved by heated plates or like means whereby heat application to essentially the surfaces of the strapping edges and the continuity and depth of fusion can be effectively controlled. With the apparatus as hereafter described, heat application is accomplished while the strapping is longitudinally advanced continuously relative to a heated plate or the like and preferably, but not necessarily, with the strapping edge surfaces being sequentially treated.

As employed herein, "rectangular plastic strapping", refers to strapping formed of orientable thermoplastic polymeric material, such as polypropylene, having a generally rectangular cross-section in which its width is many times its thickness. Such strapping, after orientation, may have a thickness of from about 10 to 40 mils and may be formed in a variety of widths, as for example, from about ¼ inch to 1 inch or more. In view of the thinness of such oriented strapping, it is evident that any deorientation effected along the sides thereof results in a drastic decrease in its tensile strength and thus should be avoided. Deorientation along the strapping edge surfaces, in accordance with the method of the present invention, should be as shallow as commensurate with the abrasion resistance desired in the finished strapping. Obviously, a deorientation along the surfaces of the strapping edges of, one mil for example, results in a negligible loss in the strapping tensile strength as compared to that which would be experienced with a like deorientation along the surfaces of the strapping sides.

The teachings of the present invention are especially advantageous with plastic strapping which has been worked by longitudinal stretching to effect the predominantly longitudinal orientation thereof. Accordingly, for the sake of simplicity this invention is hereafter described in detail as applied to strapping which has been longitudinally oriented by being stretched at a draw ratio of from 6 to 12, and desirably about 8.

With reference to the drawing,

FIG. 1 is a diagrammatic illustration of the apparatus of the present invention;

FIG. 2 illustrates on an enlarged scale a member of the apparatus shown in FIG. 1;

FIG. 3 is an end view of the member shown in FIG. 2; and

FIG. 4 is a section, shown on an enlarged scale, taken along the line IV—IV of FIG. 2.

With reference to FIG. 1 of the drawing, character 9 indicates a conventional unoriented, generally rectangular polypropylene strapping which is advanced from a suitable supply, not shown, by a set of rolls 11 and then through an oven 13 under the influence of driven drums 15, 17, 19, 21 and 23. Within the oven 13, which may be heated by infrared lamps or gas, the strapping 9 is heated to a temperature of from about 140° to 300° F, preferably from about 180° to 230° F. Outwardly of the oven 13, the temperature of the strapping 9 is closely controlled by drums 15, 17, 19, 21 and 23, with the drums 15 and 17 being internally heated to a temperature of about 260° F and the drums 19, 21 and 23 being internally cooled to a temperature of about 45° F.

The drums 15 and 17 are together rotated at a common speed, as are the drums 19, 21 and 23, with the speed of the drums 19, 21 and 23 being greater so that the strapping 9, being nipped by the drum 17 and roll 18, is stretched longitudinally during its travel between the drums 17 and 19. Stretching of the strapping 9 is at a draw ratio of from 6 to 12 and preferably about 8. With the polypropylene strapping 9 having been stretched about 8 times its original length the molecules thereof are oriented predominantly in the longitudinal direction of the strapping, with about 60% of the molecules being oriented within 10° of the strapping longitudinal axis. Of course, the higher the draw ratio, the greater the longitudinal molecular orientation and tensile strength of the strapping 9 and the lower its elongation. Thus, the characteristics desired in a particular molecularly oriented strapping 9 will dictate the draw ratio which is selected.

During passage over the drums 19, 21, and 23 the now molecularly oriented strapping 9 is at least surface cooled and, if desired, may be further cooled, as by an extended travel through the ambient atmosphere or a chill tank. Pairs of rollers 25 and 27 maintain the strapping 9 engaged first with the periphery of a driven disk 29 and then with the periphery of a like driven disk 31, after which the strapping 9 is collected as a roll 33. The strapping 9 travels with the respective disks 29 and 31 and during such travel its opposite longitudinal edges 35 and 37 are sequentially treated as hereafter described.

With reference to FIGS. 2–4, the disk 29 is locked to a shaft 39 which is rotatably mounted on suitable fixed supports 41 and 43. A sprocket 45 is also fixed to the shaft 39 and is driven in a direction as indicated in FIG. 1 by a motor, not shown, through a chain 47. The disk 29 may be formed of metal, such as aluminum, and along one side thereof, is recessed at 49 for the reception of a ring of heat insulating material 51 which is fixed in place, as by bonding.

A heating ring 53 is mounted on the support 41 by a series of spaced studs 55, with springs 57 encircling such studs 55 and resiliently urging the heating ring 53 into engagement with the disk heat insulating ring 51. As best shown in FIG. 4, the heating ring 53 is of channel cross-section, having flanges 59 and 61, the later of which projects beyond the periphery of the disk 29 and is adapted to engage with the longitudinal edge 35 of the strapping 9. Preferably, and as illustrated in FIG. 2, only a portion of the ring flange 61 is heated, as by an electrical resistance element 63, which is connected by wires 65 and 67 to a suitable electrical source.

Disposed opposite to the heating ring 53, and mounted by bolts 69 for rotation with the disk 29, is a pressure ring 71 having a flange which projects over the disk periphery. Springs 75, encircled about the bolt shanks and interposed between the pressure ring 71 and nuts 77, resiliently urge the pressure ring flange into engagement with the longitudinal edge 37 of the strapping 9 to thus maintain the opposite longitudinal edge 35 of such strapping 9 snugly in contact with the heating ring 53.

The disk 31 is like in construction to the disk 29 and cooperates with heating and pressure rings, such as the rings 53 and 71 described above. However, in this instance, the heatng and pressure rings are intended to engage, respectively, with the longitudinal edges 37 and 35 of the strapping 9 as it travels with the periphery of the disk 31. Thus, the rotation of the disk 31 and the position of its related heating and pressure rings, are such as would be assumed by the disk 29 and rings 53 and 71 upon turning the same through an angle of 180° toward the viewer from their positions shown in FIG. 1.

In the use of the above described apparatus, a rectangular unoriented polypropylene strapping 9 is preheated, preferably to a temperature of 180°–300° F during passage through the oven 13, maintained at about its preheated temperature during travel with the heated drums 15 and 17, molecularly oriented in predominantly its longitudinal direction by being stretched during its advancement between the rollers 17 and 19 and then cooled to the ambient temperature during travel with the rollers 19, 21 and 23 and, if desired, by supplementary cooling means, such as a chill tank.

During the longitudinal stretching of the polypropylene strapping, the opposite longitudinal edges thereof assume a fibrillar character, often with minute fibrils projecting outwardly from the surfaces of such longitudinal edges. Accordingly, the now molecularly oriented polypropylene strapping is laced over the disk 29 where its longitudinal edge surface 35 is heated by the heating ring 53 to such temperature, as for example 400°–500° F for polypropylene strapping, as to at least fuse the fibrils projecting from such surfaces and thus deorient the same. The pressure ring 71 resiliently engages with the opposite longitudindal edge 37 of the strapping 9 and thus urges the same snugly against the heating ring 53. The degree of heating can, of course, be varied and, if desired, the surface of the longitudinal edge 35 of the strapping 9 may be fused substantially continuously along its entire length. Only shallow heating of the strapping edge 35 is involved and thus such edge 35 is rapidly cooled by the ambient atmosphere. Forced cooling of the strapping edge 35 may be employed, if necessary.

Upon leaving the disk 29, the strapping 9 is now engaged with the periphery of the disk 31 where its opposite longitudinal edge 37 is heated in a manner and to a degree as described above.

As described above, the longitudinal edges 35 and 37 of the strapping 9 may be heated to fuse fibrils projecting from the surfaces of such edges or to substantially continuously fuse such edge surfaces or to some degree therebetween. The extent of such fusion may be controlled by varying the degree and/or duration of heating and/or the pressure under which the respective strapping edge surfaces are urged against the heating ring. Obviously, the strapping 9 may be collected after being longitudinally stretched and then subsequently, and independently of the stretching thereof, be treated to provide for the desired edge fusion. This last mentioned procedure offers the further advantage that the depth or degree of strapping edge fusion may also be regulated by controlling the speed at which the strapping is advanced relative to the heating rings.

The fusion which is provided along the strapping edge surfaces, whether it be that of fusing projecting fibrils or to a greater degree up to providing a continuous fused layer along one or each of such edge surfaces serve to reduce and/or at least minimize fraying and dusting to occur along such strapping edges. More specifically, the fused and thus deoriented portions along the strapping edge surfaces, being exposed, have a lesser tendency to dust than the fibrillar structures which was heretofore present and serve to arrest fibrillation which might occur when such strapping edges are exposed to friction or rubbing forces.

It is to be understood that changes and variations may be made without departing from the spirit and scope of the invention as defined in the appended claims.

I claim:

1. A method for making a generally rectangular plastic strapping having improved resistance to edge abrasion including the steps of working a generally rectangular strapping formed of orientable, thermoplastc, polymeric material to orient the molecules thereof in predominantly the longitudinal direction thereof, whereby the opposite longitudinal edges of such strapping exhibit a fibrillar character, applying heat essentially to only the surfaces of the opposite longitudinal edges of such worked strapping to fuse at least fibrils projecting therefrom and provide such strapping edge surfaces with at least portions which are essentially free of molecular orientation, and thereafter cooling the fused portions of the strapping edge surfaces to room temperature.

2. In a method as defined in claim 1 wherein heat is applied essentially to only the surfaces of the opposite longitudinal edges of the molecularly oriented strapping to provide such strapping edges with substantially continuous fused surfaces which are essentially free of molecular orientation.

3. In a method as defined in claim 1 wherein said orientable, thermoplastic, polymeric material is polypropylene and wherein said polypropylene strapping is worked by being stretched in its longitudinal direction to a draw ratio of from about 6 to about 12.

4. In a method as defined in claim 3 wherein heat is applied essentially to only the surfaces of the opposite longitudinal edges of the stretched polypropylene strapping to provide such strapping edges with substantially continuous fused surfaces which are essentially free of molecular orientation.

5. A generally rectangular plastic strapping having improved resistance to edge abrasion, said strapping formed of orientable, thermoplastic, polymeric material and having been worked to orient the molecules thereof in predominantly the longitudinal direction of the strapping, the surfaces of the opposite longitudinal edges of said molecularly oriented strapping beng substantially free of projecting fibrils and having at least portions thereof which are fused and essentially free of molecular orientation as a result of a confined application of heat essentially to only the surfaces of the opposite longitudinal edges of the molecularly oriented strapping followed by cooling thereof to room temperature.

6. A plastic strapping as defined in claim 5 wherein the surfaces of the opposite longitudinal edges of the molecularly oriented strapping have substantially continuous fused portions which are essentially free of molecular orientation.

7. A plastic strapping as defined in claim 5 wherein the orientable, thermoplastic, polymeric material is polypropylene and wherein such polypropylene strapping has been worked by being stretched in its longitudinal direction to a draw ratio of from about 6 to about 12.

8. A plastic strapping as defined in claim 7 wherein the surfaces of the opposite longitudinal edges of the stretched polyproplyene strapping have substantially continuous fused portions which are essentially free of molecular orientation.

9. Apparatus including means for working a continuous travelling, generally rectangular strapping formed of orientable, thermoplastic, polymeric material to orient the molecules thereof in predominantly the longitudinal direction thereof, means for heating essentially only the surfaces of the opposite longitudinal edges of such molecularly oriented strapping concomitantly with the continuous advancement of such strapping to thereby fuse and deorient at least fibrils projecting from the strapping edge surfaces, and means for cooling of the heated edge surfaces of the strapping.

10. Apparatus as defined in claim 9 wherein said heating means include separate heating means for sequentially and independently heating opposite edge surfaces of the strapping and further including means for resiliently urging the strapping against said separate heating means.

* * * * *